(12) United States Patent
Peacock

(10) Patent No.: US 6,248,832 B1
(45) Date of Patent: Jun. 19, 2001

(54) CROSSLINKED BLENDS OF AMORPHOUS AND CRYSTALLINE POLYMERS AND THEIR APPLICATIONS

(75) Inventor: Andrew J. Peacock, Houston, TX (US)

(73) Assignee: Exxon Mobile Chemical Patents Inc., Houston, TX (US)

( * ) Notice: Subject to any disclaimer, the term of this patent is extended or adjusted under 35 U.S.C. 154(b) by 0 days.

(21) Appl. No.: 09/458,330

(22) Filed: Dec. 10, 1999

(51) Int. Cl.[7] ............................. C08L 23/00; C08L 23/04
(52) U.S. Cl. ............................................. 525/191; 525/240
(58) Field of Search ..................................... 525/191, 240

(56) References Cited

U.S. PATENT DOCUMENTS 5,539,056    7/1996   Yang et al. ........................... 525/240

FOREIGN PATENT DOCUMENTS 366 411 A2    5/1990   (EP) .
527 589 B1    2/1993   (EP) .

*Primary Examiner*—Nathan M. Nutter
(74) *Attorney, Agent, or Firm*—Frank E. Reid; Charles E. Runyan

(57) ABSTRACT

The present invention is broadly directed to a polyolefin polymer composition produced by copolymerizing one or more alpha-olefins and one or more di-olefin monomers in the presence of at least one stereospecific metallocene catalyst system and at least one non-stereospecific metallocene catalyst system. The polymer composition so produced contains amorphous polymer segments and crystalline polymer segments in which at least some of the segments are crosslinked. Both the amorphous and the crystalline polymer segments are copolymers of one or more alpha-olefins and one or more di-olefin monomers. Crosslinking of at least a portion of the mixture of polymer segments is accomplished during the polymerization of the composition by incorporation of single di-olefin comonomers into two polymer segments.

14 Claims, No Drawings

CROSSLINKED BLENDS OF AMORPHOUS AND CRYSTALLINE POLYMERS AND THEIR APPLICATIONS

FIELD OF THE INVENTION

This invention relates to a thermoplastic composition which is a mixture of crystalline and amorphous polyolefin copolymers. This invention further relates to a process to produce such thermoplastic compositions by copolymerizing alpha-olefins and $\alpha,\omega$-dienes using two separate catalyst systems.

BACKGROUND INFORMATION

It is well recognized that amorphous polypropylene (aPP), even at a very high molecular weight (e.g. $M_w>1,000,000$ g/cc) is a soft, rubbery, gel-like material which possesses very low crystallinity and therefore poor physical properties. Because of its poor mechanical strength, this material has found few practical uses compared to isotactic polypropylene (iPP), which has crystallinity and therefore better mechanical properties.

Individual polyolefins having certain characteristics are often blended together in the hopes of combining the positive attributes of the components. Typically, however, the result is a blend which displays a weighted average of the individual properties of the individual resins.

For example EP 0 527 589 discloses blends of flexible low molecular weight amorphous polypropylene with higher molecular weight isotactic polypropylene to obtain compositions with balanced mechanical strength and flexibility. These compositions show better flexibility compared to the isotactic polypropylene alone, but the elastic recovery properties are still poor.

U.S. Pat. No. 5,539,056 discloses polyolefin compositions comprising a blend of amorphous poly-alpha-olefin having a weight average molecular weight ($M_w$) of at least about 150,000 and a crystalline poly-alpha-olefin having an $M_w$ of less than about 300,000 and less than that of the amorphous poly-alpha-olefin. These compositions were produced by polymerizing alpha-olefin in the presence of two different cyclopentadienyl transition metal compounds or by producing the polymers independently and subsequently blending them together.

EP 0 366 411 discloses a graft polymer having an EPDM backbone with polypropylene grafted thereto at one or more of the diene monomer sites through the use of a two-step process using a different Ziegler-Natta catalyst system in each step. This graft polymer is stated to be useful for improving the impact properties in blended polypropylene compositions.

Although each of the polymers described in the above references has new and interesting properties, there remains a need for new compositions offering other new and different balances of mechanical properties controllably tailored for a variety of end uses. It would be desirable to find a composition that is very strong yet having both good flexibility and elasticity characteristics. It would further be desirable to produce such a composition with a minimum of processing steps.

SUMMARY OF THE INVENTION

The present invention is broadly directed to a polyolefin polymer composition produced by copolymerizing one or more $C_3$ or higher alpha-olefins and one or more di-vinyl monomers in the presence of at least one stereospecific metallocene catalyst system and at least one non-stereospecific metallocene catalyst system in the same polymerization medium. The polymer composition so produced contains amorphous polymer segments and crystalline polymer segments in which at least some of the segments are crosslinked. Both the amorphous and the crystalline polymer segments are copolymers of one or more alpha-olefins and one or more monomers having at least two olefinically unsaturated bonds. Both of these unsaturated bonds are suitable for and readily incorporated into a growing polymer chain by coordination polymerization using either the stereospecific or the non-stereospecific catalysts independently such that the di-olefin is incorporated into polymer segments produced by both catalysts in the mixed catalyst system according to this invention. In a preferred embodiment these monomers having at least two olefinically unsaturated bonds are di-olefins, preferably di-vinyl monomers. Crosslinking of at least a portion of the mixture of polymer segments is accomplished during the polymerization of the composition by incorporation of a portion of the di-vinyl comonomers into two polymer segments. At least a portion of the di-vinyl monomers are polymerized into two polymer segments, thus producing a crosslink between those segments.

DETAILED DESCRIPTION OF THE INVENTION

In a preferred embodiment, the polyolefin polymer composition of this invention is a blend of polymeric segments which are crosslinked or in which at least a portion of the segments are joined chemically through carbon-to-carbon bonds. This blend includes amorphous polymer segments and crystalline polymer segments. In a preferred embodiment, the amorphous polymer segments and the crystalline polymer segments are each copolymers of one or more alpha-olefins and one or more di-olefin monomers in which both of the double bonds can be copolymerized with the one or more alpha-olefins using both the stereospecific or the non-stereospecific catalyst simultaneously.

The polymerization of both the amorphous and the crystalline polymer segments is performed in a single step. In other words, both polymerizations are carried out simultaneously with both catalysts present in the same reaction medium. Both the type and amount of the diolefin monomer are selected to produce a sufficient amount of crosslinking of polymer segments to produce the desired physical properties in the final composition. Crosslinking, for purposes of this invention, refers to the connection of two polymer segments by incorporation of each double bond of a diolefin monomer into two different polymer segments. The polymer segments so connected can be the same or different, with respect to their crystallinity. Three or more polymer segments may also be connected via incorporation of two or more diolefins in on polymer segment into two other polymer segments.

In a particularly preferred embodiment, the product produced is a blend of isotactic polypropylene segments and atactic polypropylene segments with sufficient crosslinking via diene incorporation into both types of segments to produce an improved balance of properties in the bulk composition. Polymer or polypropylene segments, as used herein, are intended to refer to copolymers containing the selected diolefin monomers as a minor constituent. The crosslinked final composition contains a mixture of linkage types via incorporation of single diolefin monomers into two separate polymer segment. These linkage types include connections between two amorphous copolymer segments, connections between two said crystalline copolymer segments, and connections between amorphous copolymer segments and crystalline copolymer segments. The presence of these crosslinked structures, produced by diene incorporation into the growing segments of the crystalline/amorphous polymer blend result in new and different physical properties versus those found in the prior art.

Monomers

A primary consideration for selection of the monomer, or combinations of monomers, is that, both crystalline and amorphous polymer segments can be formed with the proper selection of two or more different metallocene catalyst systems. It is further necessary that the level of incorporation of the diolefin monomer into the crystalline segments be limited to an amount that will not substantially alter its crystallinity. Yet another reason to limit the addition of diolefin monomer is to limit the level of crosslinking to a level such that the overall composition remains a thermoplastic.

The $\alpha$-olefins include linear, branched, or ring-containing $C_3$ to $C_{30}$ prochiral $\alpha$-olefins or combinations thereof capable of being polymerized by both the stereospecific and the non-stereospecific catalysts selected. Prochiral, as used herein, refers to monomers that favor the formation of isotactic or syndiotactic polymer when polymerized using the selected stereospecific catalyst(s).

Preferred linear $\alpha$-olefins include $C_3$ to $C_8$ $\alpha$-olefins, more preferably propylene, 1-butene, 1-hexene, and 1-octene, even more preferably propylene or 1-butene. Preferred branched $\alpha$-olefins include 4-methyl-1-pentene, 3-methyl-1-pentene, and 3,5,5-trimethyl-1-hexene. Preferred ring-containing $\alpha$-olefins include as a ring structure at least one aromatic-group.

Preferred aromatic-group-containing monomers contain up to 30 carbon atoms. Suitable aromatic-group-containing monomers comprise at least one aromatic structure, preferably from one to three, more preferably a phenyl, indenyl, fluorenyl, or naphthyl moiety. The aromatic-group-containing monomer further comprises at least one polymerizable double bond such that after polymerization, the aromatic structure will be pendant from the polymer backbone. Preferred aromatic-group-containing monomers contain at least one aromatic structure appended to a polymerizable olefinic moiety. The polymerizable olefinic moiety can be linear, branched, cyclic-containing, or a mixture of these structures. When the polymerizable olefinic moiety contains a cyclic structure, the cyclic structure and the aromatic structure can share 0, 1, or 2 carbons. The polymerizable olefinic moiety and/or the aromatic group can also have from one to all of the hydrogen atoms substituted with linear or branched alkyl groups containing from 1 to 4 carbon atoms. Particularly preferred aromatic monomers include styrene, alpha-methylstyrene, vinyltoluenes, vinylnaphthalene, allyl benzene, and indene, especially styrene and allyl benzene.

Preferred diolefin monomers useful in this invention include any hydrocarbon structure, preferably $C_4$ to $C_{30}$, having at least two unsaturated bonds, wherein at least two of the unsaturated bonds are readily incorporated into a polymer by either the stereospecific or the non-stereospecific catalyst(s). It is further preferred that the diolefin monomers be selected from $\alpha,\omega$-diene monomers (i.e. di-vinyl monomers) suitable for copolymerization with the selected alpha-olefin(s) using each of the selected metallocene catalyst systems. More preferably, the diolefin monomers are linear di-vinyl monomers, most preferably those containing from 4 to 30 carbon atoms. Preferred diolefin monomers according to this invention should contain no polar groups and should not act as a poison to any of the selected catalysts.

Catalysts

Non-stereospecific catalysts for the production of the amorphous polymer segments (atactic alpha-olefin-diene copolymers) of this invention include any catalyst system capable of copolymerizing the selected alpha-olefin monomer(s) and diolefin monomer(s). Such catalysts are well known to those skilled in the art. For additional detail on such catalysts, reference can be made to U.S. Pat. No. 5,723,560, which is fully incorporated by reference herein for purposes of U.S. patent practice.

Illustrative, but not limiting examples of preferred non-stereospecific metallocene catalysts are:

[dimethylsilanediyl(tetramethylcyclopentadienyl)(cyclododecylamido)]metal dichloride;

[dimethylsilanediyl(tetramethylcyclopentadienyl)(t-butylamido)]metal dichloride; and

[dimethylsilanediyl(tetramethylcyclopentadienyl)(exo-2-norbornyl)]metal dichloride;

wherein the metal can chosen from Zr, Hf, or Ti, preferably Ti.

Stereospecific catalysts for the production of the crystalline polymer segments (isotactic or syndiotactic alpha-olefin-diene copolymers) of this invention include any catalyst system capable of copolymerizing the select alpha-olefin monomer(s) and diolefin monomer(s). Such stereospecific catalysts should at the same time polymerize the alpha-olefin monomer(s) in a stereospecific structure such that the crystalline polymer segments contain isotactic or syndiotactic monomer sequences sufficient to produce a heat of fusion, as measured by DSC, of 10 J/g or more. For additional detail on such catalysts, reference can be made to U.S. Pat. No. 5,770,753 and to W. Spaleck, et al., "The Influence of Aromatic Substituents on the Polymerization Behavior of Bridged Zirconocene Catalysts," Organometallics, 13, 954–963 (1994), both of which are fully incorporated by reference herein for purposes of U.S. patent practice.

Illustrative, but not limiting examples of preferred stereospecific metallocene catalysts are the racemic isomers of:

[dimethylsilanediylbis(2-methyl-4-phenylindenyl)]metal dichloride;

[dimethylsilanediylbis(2-methyl)]metal dichloride;

[dimethylsilanediylbis(indenyl)metal dichloride;

[dimethylsilanediylbis(indenyl)metal dimethyl;

[dimethylsilanediylbis(tetrahydroindenyl)metal dichloride;

[dimethylsilanediylbis(tetrahydroindenyl)metal dimethyl;

[dimethylsilanediylbis(indenyl)metal diethyl; and

[dibenzylsilanediylbis(indenyl)metal dimethyl;

wherein the metal can be chosen from Zr, Hf, or Ti, preferably Zr.

The activator for the mixed catalyst system of this invention (i.e. at least one non-stereo-specific and at least on stereo-specific catalyst) can be used in conjunction with any activation system which promotes coordination catalysis, typically either an alumoxane or a non-coordinating anion activator.

Alumoxanes are well known in the art and methods for their production are illustrated by U.S. Pat. Nos. 4,542,199; 4,544,762; 5,015,749; and 5,041,585. A technique for preparing modified alumoxanes has been disclosed in U.S. Pat. No. 5,041,584, and in EPA 0 516 476 and in EP 0 561 476, all of which are fully incorporated herein by reference for purposes of U.S. patent practice.

Descriptions of ionic catalysts for coordination polymerization comprised of metallocene cations activated by non-coordinating anions appear in the early work in EP-A-0 277 003, EP-A-0 277 004 and U.S. Pat. No. 5,198,401 and WO-A-92/00333, all of which are fully incorporated herein by reference for purposes of U.S. patent practice. These teach a preferred method of preparation wherein metallocenes (bis-Cp and mono-Cp) are protonated by an anionic precursors such that an alkyl/hydride group is abstracted from a transition metal to make it both cationic and charge-balanced by the non-coordinating anion.

The use of ionizing ionic compounds not containing an active proton but capable of producing both the active metallocene cation and a noncoordinating anion is also known. For additional detail see, EP-A-0 426 637 and EP-A-0 573 403, both of which are fully incorporated herein by reference for purposes of U.S. patent practice. An additional method of making the ionic catalysts uses ionizing anionic pre-cursors which are initially neutral Lewis acids but form the cation and anion upon ionizing reaction with the metallocene compounds, for example the use of tris (pentafluorophenyl) boron, as described in EP-A-0 520 732, which is fully incorporated herein by reference for purposes of U.S. patent practice. Ionic catalysts for addition polymerization can also be prepared by oxidation of the metal centers of transition metal compounds by anionic pre-cursors containing metallic oxidizing groups along with the anion groups, as described in EP-A-0 495 375, which is fully incorporated herein by reference for purposes of U.S. patent practice.

The catalyst system of this invention may be supported on an inert carrier. Methods of supporting alumoxane activated metallocene catalyst systems are well known in the art. Methods of supporting ionic catalysts comprising metallocene cations and noncoordinating anions are described in U.S. Pat. No. 5,057,475, 5,643,847, WO91/09882, WO 94/03506 and WO 96/04320, all of which are fully incorporated herein by reference for purposes of U.S. patent practice.

Process

The polymerization processes forming the crosslinked blends of this invention are performed in a common reaction medium containing the monomers, both alpha-olefin(s) and di-olefin(s), at least one non-stereo-specific metallocene catalyst system, and at least one stereo-specific metallocene catalyst system. "Alpha-olefin" and "di-olefin" are distinguished herein in that an alpha-olefin has only one double-bond that is readily polymerizable by both of the selected catalyst systems.

The catalyst systems employed in the method of the invention comprise a complex formed upon admixture of the two or more catalyst components with one or more activator components. The catalyst system may be prepared by addition of the requisite catalysts as described above, preferably Group IV B transition metal catalysts, and activator components to an inert solvent in which olefin polymerization can be carried out by a solution, slurry, gas phase or bulk phase polymerization procedure, most preferably a solution or slurry polymerization process.

The catalyst system may be conveniently prepared by placing the selected catalyst components and the selected activator component, in any order of addition, in an alkane or aromatic hydrocarbon solvent-preferably one which is also suitable for service as a polymerization diluent. When the hydrocarbon solvent utilized is also suitable for use as a polymerization diluent, the catalyst system may be prepared in situ in the polymerization reactor. Alternatively, the catalyst system may be separately prepared, in concentrated form, and added to the polymerization diluent in a reactor. If desired, the components of the catalyst system may be prepared as separate solutions and added to the polymerization diluent in a reactor, in appropriate ratios, as is suitable for a continuous liquid phase polymerization reaction procedure.

Alkane and aromatic hydrocarbons suitable as solvents for formation of the catalyst system and also as a polymerization diluent are exemplified by, but are not necessarily limited to, straight and branched chain hydrocarbons such as isobutane, butane, pentane, hexane, heptane, octane and the like, cyclic and alicyclic hydrocarbons such as cyclohexane, cycloheptane, methylcyclohexane, methylcycloheptane and the like, and aromatic and alkyl-substituted aromatic compounds such as benzene, toluene, xylene and the like. Suitable solvents also include liquid olefins which may act as monomers or comonomers including propylene, 1-butene, 1-hexene and the like.

At all times, the individual catalyst system components, as well as the catalyst system once formed, are protected from oxygen and moisture. Therefore, the reactions to prepare the catalyst system are performed in an oxygen and moisture free atmosphere and, where the catalyst system is recovered separately it is recovered in an oxygen and moisture free atmosphere. Preferably, therefore, the reactions are performed in the presence of an inert dry gas such as, for example, helium or nitrogen.

In a preferred embodiment of the process of this invention the catalyst system is utilized in a slurry liquid phase or a high pressure fluid phase or gas phase polymerization of the alpha-olefin and diolefin monomers. These processes may be employed singularly or in series. The liquid phase process comprises the steps of contacting alpha-olefin and diene monomers with the mixed catalyst system in a suitable polymerization diluent and reacting said monomer in the presence of said catalyst system for a time and at a temperature sufficient to produce the crosslinked copolymer blends of this invention.

The catalyst system ingredients-that is, the catalysts, the activator component, and polymerization diluent-can be added to the reaction vessel rapidly or slowly. Conditions most preferred for the polymerization process are those wherein the alpha-olefins and diolefins are submitted to the reaction zone at pressures of from about 0.019 psia (0.131 kPa) to about 50,000 psia (345 MPa), preferably 50 (345 kPa) to 1500 psia (10.34 MPa), more preferably 120 psia (827 kPa) to 1000 psia (6895 kPa), and the reaction temperature is maintained at from about $-100°$ C. to about $300°$ C., preferably $0°$ C. to $180°$ C., more preferably $30°$ C. to $120°$ C., even more preferably less than $90°$ C., most preferably less than $80°$ C.

In a preferred embodiment of the invention optimum results are obtained when the total of the catalyst compounds are present in the polymerization diluent in a concentration of from about 0.00001 to about 1.0 millimoles/liter of diluent and the alumoxane component is present in an amount to provide a molar aluminum to transition metal ratio of from about 1:1 to about 20,000:1 or the ionic activator component is present in an amount to provide a molar activator to transition metal molar ratio of from about 50:1 to about 1:20. Sufficient solvent should be employed so as to provide adequate heat transfer away from the catalyst components during reaction and to permit good mixing. A more preferable range for the aluminum to transition metal molar ratio would be 1:1 to 2000:1 and for an ionic activator to transition metal molar ratio would be about 20:1 to about 1:5. The reaction time is preferably from about 10 seconds to about 10 hours. These ratios are based on the total of both the stereospecific and the non-stereospecific catalysts.

In one preferred embodiment, wherein catalysts having similar activity (in terms of kg of polymer produced, per mole of transition metal contained in the catalyst, per hour) to those used the examples below are employed, the ratio of non-stereospecific catalyst to stereospecific catalyst is preferably in the range of from 20:1 to 120:1, more preferably from 30:1 to 110:1, even more preferably from 40:1 to 100:1. The activity level of the non-stereospecific to stereospecific catalysts employed in the practice of this invention as it relates to the chosen monomers and process conditions can be readily determined by methods well known to those skilled in the art. For catalysts having different activity levels than those of the examples below, preferred compositions are produced by selecting a ratio of non-stereospecific catalyst to stereospecific catalyst that would be expected to produce amorphous polymer segments and crystalline polymer segments in a ratio in the range of from 2:1 to 20:1, more preferably from 3:1 to 10:1, even more preferably from 4:1 to 8:1 (all ratios of amorphous to crystalline).

Scavengers may be used as described in pending U.S. patent application Ser. No. 08/455,960 and WO 94/07927 which is fully incorporated herein by reference for purposes of U.S. patent practice.

The diolefin monomer(s), preferably di-vinyl monomer (s), are added to the reaction medium in an amount sufficient to produce a detectable amount of crosslinking but are limited to an amount such that the final composition remains thermoplastic. For the purposes of this invention, the amount of crosslinking is determined using the crosslinking index g of the crosslinked polypropylene. The crosslinking index g is defined as the ratio of the radius of gyration of the crosslinked polymer to the radius of gyration of a linear polymer $g=[R_g]^2_{cr}/[R_g]^2_{lin}$. It is well known in the art that as the g value decreases, crosslinking increases. "$R_g$" stands for Radius of Gyration, and is measured using Multi-Angle Laser Light Scattering (MALLS) equipment. "$[R_g]_{cr}$" is the Radius of Gyration for the crosslinked polymer sample and "$[R_g]_{lin}$" is the Radius of Gyration for a linear polymer sample.

Crosslinking is indicated when the polymer radius of gyration deviates from that measured for a linear polymer. The average deviation level was calculated from GPC/MALLS data using the procedure outlined in the examples below. First, the GPC/MALLS data was used to measure molecular weight averages ($M_w$, $M_z$) and to measure polymer radius of gyration as a function of absolute molecular weight. For polypropylene polymers, the MALLS measurement of $R_g$ is particularly sensitive in the range from 100,000 Daltons to about 2,000,000 Daltons. For this reason, the data was then truncated outside this range. Weight-average values of g were calculated from the data points that fall in the range of from the characteristic $M_w$ of the polymer examined to the upper limit of 2,000,000 Daltons. For any case in which some values of $M_w$ that are below 100,000 Daltons, the weight average is calculated using only those points between 100,000 Daltons and 2,000,000 Daltons.

Product

Amorphous poly-alpha-olefins, generally regarded to be atactic, noncrystalline and lacking in a molecular lattice structure which is characteristic of the solid state, tend to lack well defined melting points. For purposes of this invention, amorphous and atactic are synonymous and are intended to include that which is substantially amorphous or substantially atactic. An amorphous polymer segment is herein defined to mean a polymer segment that lacks or has a poorly defined melting point and that further has little or no crystallinity. The amorphous product of this invention is substantially, preferably completely, atactic.

The amorphous alpha-olefin-diene copolymer segments preferably have a heat of fusion of 6 J/g or less, more preferably 4 J/g or less, even more preferably 2 J/g or less, and most preferably no detectable heat of fusion.

The amorphous alpha-olefin-diene copolymer segments additionally have a glass transition temperature ($T_g$) which is lower than the use temperature of the final composition of this invention. Preferably, the final composition of this invention has a $T_g$ of 25° C. or less.

The weight average molecular weight of the alpha-olefin-diene copolymer can be between 10,000 to 5,000,000, preferably 80,000 to 500,000 g/mole with a MWD ($M_w/M_n$) between 1.5 to 40.0, more preferably between about 1.8 to 5 and most preferably between 1.8 to 3.

The crystalline polymer segments contain crystallinity derived from stereoregular segments, preferably isotactic or syndiotactic sequences, more preferably isotactic sequences, obtained by polymerization of continuous sequences of the α-olefin monomers within the crystalline polymer segments. Particularly preferred crystalline segments contain polypropylene-diene copolymers containing the di-vinyl monomer as the diene. The diene is present in an amount sufficient to produce the desired level of crosslinking yet low enough to preserve the crystalline character of the segments. The balance of crosslink density and crystallinity help produce the new and useful balance of properties of the composition of this invention.

Preferred crystalline segments have an average alpha-olefin content, preferably propylene content, on a molar basis of from about 95% to about 99.9%, more preferably from about 97% to about 99.8%, even more preferably from about 99% to about 99.7%. The balance of the copolymer is one or more minor α-olefins as specified above and optionally minor amounts of one or more diene monomers.

The crystalline alpha-olefin diene copolymer segments preferably have a heat of fusion greater than or equal to about 56 J/g, more preferably in the range of from about 76 J/g to about 170 J/g, and most preferably from about 95 J/g to about 151 J/g. The crystallinity of the alpha-olefin copolymer arises from crystallizable stereoregular alpha-olefin sequences.

In another embodiment, the crystallinity of the alpha-olefin-diene copolymer is expressed in terms of crystallinity percent. The thermal energy for the highest order of polypropylene is estimated at 189 J/g. That is, 100% crystallinity is equal to 189 J/g. Therefore, according to the aforementioned energy levels, the present invention preferably has a polypropylene crystallinity of greater than 30%, more preferably from about 40% to about 90%, and most preferably from about 50% to about 80% by weight as measured by DSC.

The weight average molecular weight of the alpha-olefin-diene copolymer segments can range from 10,000 to 500,000 g/mole, preferably 20,000 to 400,000, more preferably 30,000 to 300,000.

Preferably, the alpha-olefin-diene copolymer of the present invention comprises a random crystallizable copolymer having a narrow compositional distribution. The intermolecular composition distribution of the polymer is determined by thermal fractionation in a solvent. A typical solvent is a saturated hydrocarbon such as hexane or heptane. This thermal fractionation procedure is described below. Typically, approximately 75% by weight and more preferably 85% by weight of the polymer is isolated as one or two adjacent, soluble fraction with the balance of the polymer in immediately preceding or succeeding fractions. Each of these fractions has a composition (wt. % ethylene content) with a difference of no greater than 20% (relative) and more preferably 10% (relative) of the average weight % ethylene content of the alpha-olefin-diene copolymer. The alpha-olefin-diene copolymer has a narrow compositional distribution if it meets the fractionation test outlined above.

In a preferred embodiment, the final composition has a crosslinking index (g) of less than or equal to 1, more preferably less than or equal to 0.95, even more preferably less than or equal to 0.90. The amount of crosslinking increases as g decreases. As stated earlier, however, crosslinking should be limited in order to permit the final composition to remain a thermoplastic. Therefore, preferred final compositions of this invention have less than 75 percent insolubles, more preferably less than 50 percent insolubles, even more preferably less than 25 percent insolubles, by weight as measured by ASTM D3616-95 using an appropriate solvent for gel content analysis. An appropriate solvent can be determined by reference to Brandrup and Immergut, *Polymer Handbook*, 3rd ed., Wiley (1989). A particularly preferred solvent for polypropylene is 2-butoxyethanol.

Preferred compositions according to the invention have a weight average molecular weight ($M_w$), as measured by GPC/MALLS, in the range of from 100,000 to 1,000,000 g/mole, more preferably from 200,000 to 900,000, even more preferably from 300,000 to 800,000.

Preferred compositions according to the invention have an initial modulus, in the range of from 350 to 8,000 p.s.i. (2.4 to 55 MPa), more preferably from 500 to 6,000 p.s.i. (3.4 to 41 MPa), even more preferably from 1,000 to 5,000 p.s.i. (6.9 to 34 MPa).

Preferred compositions according to the invention have a tensile strength greater than or equal to 350 p.s.i. (2.4 MPa), more preferably greater than or equal to 500 p.s.i. (3.4 MPa), even more preferably greater than or equal to 1000 p.s.i. (6.9 MPa).

Preferred compositions according to the invention have a recovery from 100% strain of greater than or equal to 80%, more preferably greater than or equal to 85%, even more preferably greater than or equal to 90%.

Preferred compositions according to the invention are ductile and can be drawn to at least 300% strain of their original length, more preferably 400%, even more preferably 500%.

By appropriate selection of (1) the type and relative amounts of each of the catalyst components for use in the mixed catalyst system; (2) the types and the total and relative amounts of each monomer; (3) the type and amount of activator used relative to the amount of catalyst; (4) the polymerization diluent type and volume; (5) reaction temperature; and (6) reaction pressure, one can tailor the weight average molecular weight and balance of properties of the final composition to meet the requirements of a broad range of applications.

The compositions that are prepared in accordance with this invention can be used to make a variety of products including films, fibers, foams, adhesives, and molded articles. Such products include, but are not limited to, automotive applications, roofing, electrical insulation, sports apparel, household items, and plumbing applications. Automotive applications include door, trunk, and window seals, weather stripping, windshield wipers, wheel arch and wheel well liners, bumpers and bumper covers, and flexible boots for moveable mechanical joints. Electrical applications include use of the compositions of the invention alone or in a blend with other polymers as insulation for large and small gauge wire and cable. Sports apparel uses of the composition of the invention include use in various forms of padding and in soles of shoes. Household applications include door and window seals, weather stripping, seals for appliances such as refrigerators and dishwashers, and gaskets and seals for plumbing.

The composition of this invention can be used in any of these applications either independently or as a component of a blend with other polymers and/or additives. When used in a blend, it can be either a major or a minor component in the blend, or can itself be considered an additive (e.g. a toughening agent for polypropylene). For example, one skilled in the art would be familiar with the use of additives typically used selected applications such as, but not limited to, dyes, pigments, fillers, waxes, plasticizers, anti-oxidants, heat stabilizers, light stabilizers, anti-block agents, processing aids, and combinations thereof, and further including fillers.

An advantage of the invention over that which is currently available is the ability to customize the balance of properties over broad ranges of combinations while still utilizing a one step polymerization process.

EXAMPLES

Tables 1 through 3 show a comparison of qualities of compounds containing a mixture of atactic polypropylene and isotactic polypropylene. Examples 2–5, 7–10, 15–18, 20–24, and 26–29 demonstrate the improved balance of properties of compositions according to this invention relative to comparative Examples 1, 6, 10–14, 19, and 25.

In comparative Example 1, 1,000 ml of toluene were charged into a reactor followed by 2 ml of tri-isobutylaluminum (TIBAL) and 150 ml of propylene. After raising the reactor temperature to 60° C. with rapid stirring, 4.5 mg of a non-stereospecific catalyst, [dimethylsilanediyl (tetramethylcyclopentadienyl) (cyclododecylamido)] titanium dichloride (hereinafter Catalyst D), and 0.10 mg of a stereospecific catalyst, [dimethylsilanediylbis(2-methyl)] zirconium dichloride (hereinafter Catalyst L), with 4.6 ml of 5% methylalumoxane (MAO) in ~10 ml of toluene were injected. Product yield was 44.8 g.

For Examples 2–29, similar conditions, starting materials, and quantities were used to make other products containing both atactic polypropylene and isotactic polypropylene, except where specified otherwise in Tables 1–3. The polymerization temperature for each example were either 60° C. or 85° C. as shown in Tables 1–3. Catalyst ratios were varied intending to give target products with i-PP contents ranging from approximately 11% to 50%.

For comparative purposes, several series of reactions were performed in which a second stereospecific catalyst, [dimethylsilanediylbis(2-methyl-4-phenylindenyl)] zirconium dichloride, (hereinafter Catalyst Q), which produces a significant percentage (~70–80%) of vinyl end groups, was substituted for Catalyst L.

The conditions used for the inventive examples, which included diolefin incorporation, were similar to those without the diolefin monomer with the exception that a small quantity of 1,9-decadiene (0.1–4.0 ml) was charged as the diolefin monomer along with polypropylene as the alpha-olefin monomer. Evidence for the existence of crosslinking (via diene incorporation) was determined indirectly through testing physical properties of the final compositions and GPC/MALLS analysis.

a) Compression Molding

Plaques suitable for physical property testing were compression molded on a Carver hydraulic press. 6.5 g of polymer was molded between brass plates (0.05" thick)

lined with Teflon™ coated aluminum foil. A 0.033" thick chase with a square opening 4"×4" was used to control sample thickness. After one minute of preheat at 170° or 180° C., under minimal pressure, the hydraulic load was gradually increased to ~10,000–15,000 lbs, at which it was held for three minutes. Subsequently the sample and molding plates were cooled for three minutes under ~10,000 to 15,000 lbs load between the water cooled platens of the press. Plaques were allowed to equilibrate at room temperature for a minimum of one week prior to physical property testing.

b) Unidirectional Tensile Testing

Dogbones for tensile testing were cut from compression molded plaques using a mallet handle die. Specimen dimensions were those specified in ASTM D 1708. Tensile properties were measure on an Instron™ model 4502 equipped with a 22.48 lb load cell and pneumatic jaws fitted with serrated grip faces. Deformation was performed at a constant crosshead speed of 5.0 in/min with a data sampling rate of 25 points/second. Jaw separation prior to testing was 0.876", from which strains were calculated assuming affine deformation. Initial modulus, stress and strain at yield (where evident), stress at 100%, 200%, 300%, 400%, 500% and 1,000% strain, and stress and strain at break were calculated. A minimum of five specimens from each plaque was tested, the results being reported as the average value. All stresses quoted are "engineering" values, i.e. they are calculated based upon the original cross-sectional area of the specimen, taking no account of reduced cross-section as a function of increasing strain. Strain values in excess of 500% are questionable; most samples pulled out of the grips to some extent at higher strains. Thus, the strain calculated from crosshead separation is larger than the strain experienced in the gauge region of the sample. This phenomenon was particularly apparent in samples that exhibited high degrees of strain hardening.

c) Elastic Recovery Testing

Elastic recovery experiments were performed on an MTS model 810 equipped with a 200 lb. load cell and pneumatic jaws fitted with serrated grip faces. Specimen dimensions were the same as those used in tensile experiments. In order to maximize the amount of data available from a given sample a cyclic testing protocol was used. Each specimen was sequentially elongated to nominal strains of 100%, 200%, 300%, 400%, 500% and (optionally) 1,000% at an elongation rate of 5.0 in/min. Upon reaching each predetermined strain level the crosshead direction was immediately reversed, returning to its starting position at a rate of 5.0 in/min. Examination of the tabulated data provides an estimate of the strain level at which stress drops to zero on each return cycle. Recovery from each strain level is calculated according to:

$$\text{Rapid recovery (\%)} = \frac{100(S_x - S_r)}{S_x}$$

where:

$S_x$=Nominal strain (100%, 200% etc.)

$S_r$=Strain (%) at which stress drops to zero during return cycle

The rapid recovery and long term recovery values reported are the average of three specimens.

d) Differential Scanning Calorimetry

Differential scanning calorimetry (DSC) was performed on a TA Instruments model 2920. Samples weighing approximately 7–10 mg were cut from compression molded pads and sealed in aluminum sample pans. Each sample was scanned from −50° C. to 200° C. at 10° C./min. After completion of the first melt, samples were cooled to −50° C. at 10° C./min. and a second melt was recorded under the same conditions as the first. Integrated areas under peaks were measured and used to determine degrees of crystallinity. A value of 189 J/g was used as the heat of fusion for 100% crystalline polypropylene. Peak melting temperatures were also noted.

e) Density Determination

The densities of samples cut from compression molded plaques were measured by flotation in an isopropanol/diethylene glycol density gradient column.

f) Gel Permeation Chromotography/Multi-Angle Laser Light Scattering (GPC/MALLS)

The two main components for this test are: (a) a Waters Corporation 150 C. high temperature GPC, equipped with a differential refractometer (DRI) used to measure the solution concentration used in the MALLS analysis, and (b) a Wyatt Technology Dawn DSP MALLS detector.

The major components of the Wyatt Technology Dawn DSP MALLS detector are: (a) a 30 mW, 488 nm argon ion laser, (b) an optical flow cell, and (c) an array of 17 photodiodes placed at different collection angles about the flow cell. A heated transfer line directs the fractions eluted from the columns into the flow cell, and then from the flow cell to the DRI. The incident laser beam is directed along the length of the cell bore. The flow cell and heated transfer line are maintained at 135° C. through internal heaters.

The sequence of events in a GPC-MALLS experiment is as follows:

1) A dilute polymer solution is injected by the 150 C. onto the separation columns.

2) The columns separate the polymer molecules by geometric size, with the largest molecules eluting first.

3) The polymer fractions pass through the MALLS detector which measures the scattering intensity as a function of angle.

4) The fractions then pass through the differential refractometer which measures the polymer concentration.

5) The MALLS and DRI signals are matched up. The molecular weight and radius of gyration are then calculated for the polymer fractions.

Solvent for the GPC experiment was prepared by adding 6 grams of butylated hydroxy toluene (BHT) as an antioxidant to a 4 liter bottle of 1,2,4 Trichlorobenzene (TCB) (Aldrich Reagent grade) and waiting for the BHT to solubilize. The TCB mixture was then filtered through a 0.7 $\mu$m glass prefilter and subsequently through a 0.1 $\mu$m teflon filter. There was an additional online 0.7 $\mu$m glass prefilter/0.22 $\mu$m teflon filter assembly between the high pressure pump and GPC columns. The TCB was then degassed with an online degasser (Phenomenex, Model DG-4000).

The polymer solution was prepared by decanting a portion of the mobile phase TCB into a separate container for use in the sample preparation. Polymer samples to be tested were collected and weighed and placed in a vial with the amount needed to attain the desired concentration (typically C=2.0 mg/ml for a polyethylene sample of Mw≈100,000 g/mole). The polymer concentration in the solvent was then determined at 135° C. Relevant constants for TCB are: $\rho_{RT}$=1.4634 g/ml at room temperature, and $\rho_{T=135° C.}$=0.905X$\rho_{RT}$.

The polymer solution was then heated to 160° C. for a period of ≈2 hours with continuous agitation (100–150 rpm). The prepared sample was then placed in the carousel in the GPC injector compartment. The run conditions for the GPC-MALLS were: 3 Polymer Laboratory Mixed B type columns; 0.5 ml/minute nominal flow rate; 300 ml nominal injection volume; temperature of 135° C.; and 100 minutes run time per sample injection.

The injection volume was determined by weighing the GPC vials with solution before and after the injection sequence. The weight difference divided by $\rho_{T=135° C.}$ was assumed to be the injection volume. The flow rate was determined by weighing the amount of solvent collected in the waste line in a ≈24 hour period. The flow rate was calculated by dividing the mass of TCB collected by the collection time minutes, and than dividing by $\rho_{T=135° C.}$.

Prior to running each sample the DRI detector and injector were purged. Flow rate in the apparatus was then increase to 0.5 ml/minute, and the DRI was allowed to stabilize for 8–9 hours before injecting the first sample. The argon ion laser was turned on 1 to 1.5 hours before running samples by running the laser in idle mode for 20–30 minutes and then switching to full power in light regulation mode.

Samples were recorded in the sample queue in the Astra software as described by the Astra manual and the Astra data collection was set for 15 points per minute. Sample vials in a heated sample carousel were then placed into the Waters GPC 150 C. injector compartment. The GPC run was then started with a 20–30 minute initial delay before the first injection. After the last sample was run, the MALLS calibration procedure was performed to determine the calibration constant for data analysis.

The DRI signal from the Waters 150 C. GPC was input into the Wyatt Technology MALLS detector hardware. The conversion factor between the DRI response to a sample concentration in the MALLS software (called Astra) is referred to as Aux. 1 (short for Auxillary Input #1). The DRI was calibrated in each carousel run by standard procedures such that the data was analyzed using the concentration as measured by the DRI response instead of assuming 100% mass recovery. The MALLS detector was then calibrated by measuring the 90° TCB solvent scattering, and then calculating an effective instrument constant from the Rayleigh ratio according to standard procedures prior to shutting off the laser. The 17 photodiodes positioned around the scattering volume of the MALLS detector at different scattering angles were then normalized according to the manufacturer's recommended procedures. The interdetector volume between the MALLS detector and the DRI was performed according to the procedure as recommended by the manufacturer.

The molecular weights of the compositions and the occurrence of crosslinking in a given polymer sample were determined by using GPC-MALLS. Crosslinking was determined by establishing the polymer radius of gyration, Rg, as a function of molecular weight and comonomer content for linear polymers, then using the measured coil dimensions of the polymer sample in question as a function of molecular weight to calculate a branching indices $<g>_w$ and $<g>_z$ for the given polymer sample.

$$g_w = \frac{Rg^2_{w\_crosslinked}}{Rg^2_{w\_linear}}$$

$$g_z = \frac{Rg^2_{z\_crosslinked}}{Rg^2_{z\_linear}}$$

where $C_i$, $M_i$, and $Rg_i$ (i refers to the second moment, w, or the third moment, z) are the measured (by GPC-MALLS) polymer concentration, molecular weight, and radius of gyration at each retention volume slice.

Tables 1–3 show the physical characteristics of the compositions of the invention produced using a stereospecific/non-stereospecific mixed metallocene catalyst system with propylene and di-olefin monomers. Also shown in these tables are comparative examples of similar compositions produced either with a single catalyst and propylene and di-vinyl monomers or a mixed catalyst system without the di-vinyl comonomer.

TABLE 1

Comparison of Mechanical Properties, Composition of the Invention vs. Blends

| Example | 1 | 2 | 3 | 4 | 5 | 6 | 7 | 8 | 9 | 10 |
|---|---|---|---|---|---|---|---|---|---|---|
| Comparative/Invention | C | I | I | I | I | C | I | I | I | I |
| Non-stereospecific catalyst (NSS) | D | D | D | D | D | D | D | D | D | D |
| Stereospecific catalyst (SS) | L | L | L | L | L | L | L | L | L | L |
| Catalyst ratio (NSS/SS) | 45/1 | 45/1 | 45/1 | 45/1 | 45/1 | 93/1 | 93/1 | 93/1 | 93/1 | 93/1 |
| Target a-PP/i-PP ratio | 4/1 | 4/1 | 4/1 | 4/1 | 4/1 | 8/1 | 8/1 | 8/1 | 8/1 | 8/1 |
| Diolefin used (ml) | 0.0 | 0.2 | 0.4 | 1.0 | 2.0 | 0 | 0.5 | 1.0 | 2.0 | 4.0 |
| Diolefin (ppm) | 0 | 1,852 | 3,704 | 9,259 | 18,519 | 0 | 4,630 | 9,259 | 18,519 | 37,037 |
| Yield (g) | 44.8 | 33.5 | 30.7 | 36.0 | 31.1 | 59.1 | 45.0 | 51.4 | 54.1 | 39.2 |
| Polymerization Temp. (° C.) | 60 | 60 | 60 | 60 | 60 | 85 | 85 | 85 | 85 | 85 |
| Density (g/cm$^3$) | 0.8690 | 0.8810 | 0.8800 | 0.8860 | 0.8800 | 0.8750 | 0.9000 | 0.8975 | 0.8950 | 0.8965 |
| $T_m$ (° C.), 2$^{nd}$ melt | 141 | 145 | 140 | 140 | 138 | 124 | 131 | 129 | 132 | 121 |
| Heat of fusion (J/g) | 13 | 28 | 20 | 26 | 26 | 8 | 24 | 31 | 33 | 13 |
| Degree of crystallinity (%) | 7 | 15 | 11 | 14 | 14 | 4 | 13 | 16 | 17 | 7 |
| $M_n$ (×1,000) | 166 | 138 | 159 | 150 | 166 | 38 | 37 | 39 | — | 43 |
| $M_w$ (×1,000) | 355 | 318 | 356 | 404 | 530 | 94 | 118 | 122 | 135 | 182 |
| $M_z$ (×1,000) | 596 | 588 | 710 | 853 | 1,450 | 174 | 249 | 268 | 401 | 561 |
| $M_w/M_n$ | 2.14 | 2.30 | 2.24 | 2.69 | 3.19 | 2.43 | 3.16 | 3.10 | — | 4.19 |
| $M_z/M_n$ | 3.59 | 4.26 | 4.47 | 5.69 | 8.73 | 4.50 | 6.68 | 6.80 | — | 12.93 |
| $g_w$ | 1.05 | 1.00 | 0.95 | 0.89 | 0.73 | 0.99 | 0.96 | 0.91 | 0.76 | 0.61 |
| $g_z$ | 1.05 | 0.98 | 0.91 | 0.84 | 0.64 | 1.00 | 0.94 | 0.88 | 0.71 | 0.54 |
| Initial modulus (PSI) | 722 | 2,680 | 2,185 | 4,533 | 4,686 | 756 | 5,821 | 8,097 | 7,321 | 1,845 |
| Yield stress (PSI) | — | — | — | — | — | 98 | 375 | 481 | 484 | 207 |
| Yield strain (%) | — | — | — | — | — | 57 | 31 | 27 | 29 | 58 |
| Stress at 100% strain | 180 | 347 | 353 | 527 | 618 | 91 | 310 | 404 | 432 | 203 |
| Stress at 500% strain | 196 | 481 | 566 | 896 | 1,300 | 23 | — | 393 | 509 | 225 |
| Tensile strength (PSI) | 351 | 764 | 1,158 | 1,058 | 1,480 | 98 | 375 | 481 | 817 | 491 |

TABLE 1-continued

Comparison of Mechanical Properties, Composition of the Invention vs. Blends

| Example | 1 | 2 | 3 | 4 | 5 | 6 | 7 | 8 | 9 | 10 |
|---|---|---|---|---|---|---|---|---|---|---|
| Strain at break (%) | 1,919 | 911 | 1,116 | 626 | 595 | — | 380 | 958 | 1,108 | 1,703 |
| Recovery from 100% strain | 84 | 85 | 85 | 85 | 83 | 66 | 61 | 60 | 65 | 72 |
| Recovery from 500% strain | 76 | 77 | 79 | 76 | 73 | — | 38 | 42 | 50 | 64 |
| Recovery from 1,000% strain | 71 | — | 72 | — | — | — | — | — | — | 66 |

TABLE 2

Comparison of Mechanical Properties, Composition of the Invention vs. Blends

| Example | 11 | 12 | 13 | 14 | 15 | 16 | 17 | 18 |
|---|---|---|---|---|---|---|---|---|
| Comparative/Invention | C | C | C | C | I | I | I | I |
| Non-stereospecific catalyst (NSS) | D | D | D | D | D | D | D | D |
| Stereospecific catalyst (SS) | — | — | — | L | L | L | L | L |
| Catalyst ratio (NSS/SS) | — | — | — | 91/1 | 91/1 | 91/1 | 91/1 | 91/1 |
| Target a-PP/i-PP ratio | 1/0 | 1/0 | 1/0 | 8/1 | 8/1 | 8/1 | 8/1 | 8/1 |
| Diolefin used (ml) | 0.2 | 0.4 | 1.0 | 0 | 0.2 | 0.4 | 1.0 | 2.0 |
| Diolefin (ppm) | 1,852 | 3,704 | 9,259 | 0 | 1,852 | 3,704 | 9,259 | 18,519 |
| Yield (g) | 38.1 | 32.5 | 25.2 | 64.8 | 34.1 | 31.6 | 32.4 | 30.2 |
| Polymerization Temp. (° C.) | 60 | 60 | 60 | 60 | 60 | 60 | 60 | 60 |
| Density (g/cm$^3$) | 0.8690 | 0.8705 | 0.8750 | 0.868 | 0.8750 | 0.8760 | 0.8765 | 0.8795 |
| $T_m$ (° C.), 2$^{nd}$ melt | — | — | — | 144 | 144 | 140 | 139 | 134 |
| Heat of fusion (J/g) | 0 | 0 | 0 | 12 | 8 | 9 | 13 | 13 |
| Degree of crystallinity (%) | 0 | 0 | 0 | 6 | 4 | 5 | 7 | 7 |
| $M_n$ (×1,000) | 238 | 252 | — | 136 | 183 | 179 | — | — |
| $M_w$ (×1,000) | 450 | 537 | — | 271 | 361 | 403 | — | — |
| $M_z$ (×1,000) | 761 | 1,014 | — | 455 | 586 | 711 | — | — |
| $M_w/M_n$ | 1.89 | 2.13 | — | 1.99 | 1.97 | 2.25 | — | — |
| $M_z/M_n$ | 3.19 | 4.03 | — | 3.35 | 3.20 | 3.97 | — | — |
| $g_w$ | — | — | — | 1.05 | 1.05 | 0.98 | — | — |
| $g_z$ | — | — | — | 1.05 | 1.04 | 0.95 | — | — |
| Initial modulus (PSI) | 276 | 288 | 291 | 621 | 693 | 946 | 1,175 | 1,383 |
| Yield stress (PSI) | — | — | — | 143 | — | — | — | — |
| Yield strain (%) | — | — | — | 76 | — | — | — | — |
| Stress at 100% strain | 123 | 126 | 127 | 149 | 175 | 199 | 337 | 304 |
| Stress at 500% strain | 177 | 201 | 253 | 132 | 198 | 246 | 712 | 705 |
| Tensile strength (PSI) | 189 | 225 | 738 | 154 | 224 | 443 | 956 | 856 |
| Strain at break (%) | >3,500 | >3,500 | 346 | >3,400 | >3,400 | 2,304 | 649 | 635 |
| Recovery from 100% strain | 87 | 88 | 86 | 81 | 92 | 88 | 87 | 86 |
| Recovery from 500% strain | 82 | 88 | 86 | 69 | 82 | 83 | 84 | 84 |
| Recovery from 1,000% strain | 77 | 84 | — | | 77 | 78 | | |

TABLE 3

Comparison of Mechanical Properties, Composition of the Invention vs. Blends

| Example | 19 | 20 | 21 | 22 | 23 | 24 | 25 | 26 | 27 | 28 | 29 |
|---|---|---|---|---|---|---|---|---|---|---|---|
| Comparative/Invention | C | I | I | I | I | I | C | I | I | I | I |
| Non-stereospecific catalyst (NSS) | D | D | D | D | D | D | D | D | D | D | D |
| Stereospecific catalyst (SS) | L | L | L | L | L | L | Q | Q | Q | Q | Q |
| Catalyst ratio (NSS/SS) | 11/1 | 11/1 | 11/1 | 11/1 | 11/1 | 11/1 | 100/1 | 100/1 | 100/1 | 100/1 | 100/1 |
| Target a-PP/i-PP ratio | 1/1 | 1/1 | 1/1 | 1/1 | 1/1 | 1/1 | 88/12 | 88/12 | 88/12 | 88/12 | 88/12 |
| Diolefin used (ml) | 0.0 | 0.1 | 0.2 | 0.4 | 1.0 | 2.0 | 0.0 | 0.2 | 0.4 | 1.0 | 2.0 |
| Diolefin (ppm) | 0 | 926 | 1,852 | 3,704 | 9,259 | 18,518 | 0 | 1,852 | 3,704 | 9,259 | 18,518 |
| Yield (g) | 35.9 | 37.0 | 39.6 | 34.4 | 29.5 | 39.5 | 36.4 | 40.2 | 37.3 | 40.5 | 35.4 |
| Polymerization Temp. (° C.) | 60 | 60 | 60 | 60 | 60 | 60 | 60 | 60 | 60 | 60 | 60 |
| Density (g/cm$^3$) | 0.8770 | 0.8750 | 0.8820 | 0.8840 | 0.8880 | 0.8875 | 0.8795 | 0.8790 | 0.8800 | 0.8850 | 0.8875 |
| $T_m$ (° C.) | 141 | 140 | 144 | 140 | 141 | 136 | 157 | 152 | 148 | 144 | 137 |
| Heat of fusion (J/g) | 36 | 41 | 53 | 49 | 60 | 51 | 24 | 13 | 24 | 25 | 21 |
| Degree of crystallinity (%) | 19 | 21 | 28 | 26 | 32 | 27 | 13 | 7 | 13 | 13 | 11 |
| $M_n$ (×1,000) | 124 | 115 | 95 | 109 | 128 | 123 | — | — | — | — | — |
| $M_w$ (×1,000) | 261 | 247 | 209 | 251 | 310 | 421 | — | — | — | — | — |
| $M_z$ (×1,000) | 467 | 466 | 437 | 514 | 737 | 1,317 | — | — | — | — | — |
| $M_w/M_n$ | 2.10 | 2.15 | 2.20 | 2.30 | 2.42 | 3.42 | — | — | — | — | — |
| $M_z/M_n$ | 3.77 | 4.05 | 4.60 | 4.72 | 5.76 | 10.71 | — | — | — | — | — |
| Initial modulus (PSI) | 13,600 | 13,530 | 16,770 | 20,160 | 19,820 | 19,770 | 1,445 | 2,416 | 1,990 | 4,050 | 2,378 |
| Yield stress (PSI) | 710 | 701 | 994 | 1,089 | 1,118 | 1,255 | — | — | — | — | — |
| Yield strain (%) | 21 | 21 | 26 | 18 | 18 | 25 | — | — | — | — | — |
| Stress at 100% strain | 705 | 660 | 930 | 1,000 | 1,049 | 1,186 | 280 | 371 | 384 | 827 | 851 |

TABLE 3-continued

Comparison of Mechanical Properties, Composition of the Invention vs. Blends

| Example | 19 | 20 | 21 | 22 | 23 | 24 | 25 | 26 | 27 | 28 | 29 |
|---|---|---|---|---|---|---|---|---|---|---|---|
| Stress at 500% strain | 972 | 987 | 1,311 | 1,424 | 1,696 | 1,928 | 460 | 557 | 649 | 1,993 | |
| Tensile strength (PSI) | 1,306 | 1,174 | 1,972 | 1,839 | 2,364 | 2,734 | 609 | 892 | 930 | 1,771 | 1,239 |
| Strain at break (%) | 770 | 660 | 866 | 718 | 726 | 761 | 1,068 | 1,096 | 908 | 403 | 228 |
| Recovery from: 100% strain | 60 | 50 | 60 | 50 | 46 | 56 | 87 | 89 | 83 | 82 | 84 |
| Recovery from: 500% strain | 30 | 22 | 31 | 26 | 21 | 27 | 74 | 85 | 75 | — | — |

Examples 2–5 as compared to comparative Example 1 show that crosslinking has occurred via incorporation of the di-vinyl monomer as evidenced by the continued decrease in $g_w$ and $g_z$ as the amount of the di-vinyl monomer is increased. This is further supported by Examples 7–10 as compared to comparative Example 6 and Examples 15 and 16 as compared to comparative Example 14. These examples show that a partially crosslinlked mixture of isotactic and atactic polypropylene has been produced by the novel process of this invention. A decrease in the $g_w$ and $g_z$ is known to indicate the presence of branched polymer chains which can result primarily from multipe occurrences of the connection of polymer segments via incorporation of a single di-vinyl monomer into two separate polymer segments.

Comparative Examples 11–13 show crosslinked atactic polypropylene compositions. These examples show that crosslinking alone without the use of the strereospecific catalyst produces compositions having generally poorer initial modulus, tensile strength, and recovery than those of Examples 15–18, which use similar process variables but use a stereospecific catalyst in addition to the non-stereospecific catalyst.

Examples 20–24 show the trend toward increased tensile strength and initial modulus as diolefin addition is increased while maintaining approximately the same recovery from 100% strain relative to comparative Example 19 without diolefin.

Examples 26–29, using a different stereospecific catalyst, again show the trend toward increased tensile strength and initial modulus as diolefin addition is increased while maintaining approximately the same recovery from 100% strain relative to comparative Example 25 without diolefin.

Although the invention has been described with reference to particular means, materials and embodiments it is to be understood that the invention is not limited to the particulars disclosed and extends to all equivalents within the scope of the claims.

What is claimed is:

1. A polymer composition comprising segments of an amorphous copolymer of one or more α-olefins and one or more diolefin monomers and a crystalline copolymer of one or more α-olefins and one or more diolefin monomers, wherein a portion of said copolymer segments are crosslinked by the incorporation of single di-olefin monomers into two copolymer segments.

2. The polymer composition of claim 1 wherein said α-olefins contain from 3 to 20 carbon atoms.

3. The polymer composition of claim 2 wherein all α-olefin monomers are the same.

4. The polymer composition of claim 3 wherein said one α-olefin is propylene.

5. The polymer composition of claim 1 wherein said diolefin monomers contain from 3 to 30 carbon atoms.

6. The polymer composition of claim 5 wherein said diolefin monomers are di-vinyl monomers.

7. The polymer composition of claim 6 wherein all di-vinyl monomers are the same.

8. The polymer composition of claim 1 wherein the incorporation of single di-olefin monomers into two copolymer segments forms connections between two said amorphous copolymer segments, connections between two said crystalline copolymer segments, and connections between amorphous copolymer segments and crystalline copolymer segments.

9. The polymer composition of claim 1 having a recovery from 100% strain of 80% or more.

10. The polymer composition of claim 1 containing less than 75 weight percent insolubles.

11. The polymer composition of claim 1 having a weight average molecular weight in the range of from 100,000 to 1,000,000 g/mole.

12. The polymer composition of claim 1 having an initial modulus in the range of 350 p.s.i. to 8,000 p.s.i.

13. The polymer composition of claim 1 having a tensile strength of greater than 350 p.s.i.

14. An article of manufacture comprising the composition of claim 1.

* * * * *